US012697605B2

(12) United States Patent
Paterson et al.

(10) Patent No.: US 12,697,605 B2
(45) Date of Patent: Aug. 4, 2026

(54) PROCESS FOR PRODUCING A FISCHER-TROPSCH SYNTHESIS CATALYST AND FISCHER-TROPSCH START-UP PROCESS

(71) Applicant: BP P.L.C., London (GB)

(72) Inventors: Alexander James Paterson, Yorkshire (GB); Richard J Mercer, Billingham (GB); John West, Billingham (GB)

(73) Assignee: BP P.L.C., London (GB)

( * ) Notice: Subject to any disclaimer, the term of this patent is extended or adjusted under 35 U.S.C. 154(b) by 694 days.

(21) Appl. No.: 17/791,890

(22) PCT Filed: Jan. 8, 2021

(86) PCT No.: PCT/EP2021/050313
§ 371 (c)(1),
(2) Date: Jul. 9, 2022

(87) PCT Pub. No.: WO2021/140227
PCT Pub. Date: Jul. 15, 2021

(65) Prior Publication Data
US 2023/0049643 A1 Feb. 16, 2023

(30) Foreign Application Priority Data

Jan. 10, 2020 (WO) ................ PCT/EP2020/050586

(51) Int. Cl.
*B01J 23/75* (2006.01)
*B01J 23/00* (2006.01)
(Continued)

(52) U.S. Cl.
CPC ............. *B01J 23/75* (2013.01); *B01J 23/002* (2013.01); *B01J 23/40* (2013.01); *B01J 33/00* (2013.01); *B01J 37/14* (2013.01); *B01J 37/18* (2013.01)

(58) Field of Classification Search
CPC . B01J 23/75; B01J 23/002; B01J 23/40; B01J 33/00; B01J 37/14; B01J 37/18; C10G 2/332
See application file for complete search history.

(56) References Cited

U.S. PATENT DOCUMENTS 4,492,774 A * 1/1985 Kibby ...................... B01J 21/16
518/715
4,585,798 A 4/1986 Beuther et al.
(Continued)

FOREIGN PATENT DOCUMENTS

CN 1070594 A 4/1993
CN 102310004 A 1/2012
(Continued)

OTHER PUBLICATIONS

Solvi Storsaeter, Bard Totdal, John C. Walmsley, Bjorn Steinar Tanem, Anders Holem, Characterization of alumina-, silica-, and titania-supported cobalt Fischer-Tropsch catalysts, Oct. 20, 2005, Journal of Catalysis 236 (2005) 139-152 (Year: 2005).*
(Continued)

*Primary Examiner* — Daniel Berns
*Assistant Examiner* — Joshua Maxwell Speer
(74) *Attorney, Agent, or Firm* — McDonnell Boehnen Hulbert & Berghoff LLP

(57) ABSTRACT
The present invention relates to a process for producing a Fischer-Tropsch synthesis catalyst wherein from 15 to 40 mol. % of the cobalt thereon is in the form of cobalt oxide. The present invention also relates to a start-up process for a reduced-and-passivated cobalt-containing Fischer-Tropsch catalyst, wherein from 15 to 40 mol. % of the cobalt thereon is in the form of cobalt oxide and the reduced-and-passivated catalyst is activated by contacting the catalyst with a syngas stream.

24 Claims, 1 Drawing Sheet

(51) Int. Cl.
  *B01J 23/40*  (2006.01)
  *B01J 33/00*  (2006.01)
  *B01J 37/14*  (2006.01)
  *B01J 37/18*  (2006.01)

(56)    References Cited

U.S. PATENT DOCUMENTS

| | | | |
|---|---|---|---|
| 4,729,981 | A | 3/1988 | Kobylinski et al. |
| 4,826,800 | A | 5/1989 | McAteer |
| 9,073,803 | B2 | 7/2015 | Marion et al. |
| 10,954,450 | B2 | 3/2021 | Ferguson et al. |
| 2004/0204504 | A1* | 10/2004 | Malek ..................... B01J 37/14 |
| | | | 502/20 |
| 2007/0004810 | A1* | 1/2007 | Wang ..................... C10G 2/332 |
| | | | 518/718 |
| 2010/0022670 | A1 | 1/2010 | Soled et al. |
| 2012/0329890 | A1 | 12/2012 | Ono et al. |
| 2013/0091696 | A1 | 4/2013 | Smith et al. |
| 2013/0184360 | A1* | 7/2013 | Eri ......................... B01J 35/615 |
| | | | 502/328 |
| 2015/0273443 | A1 | 10/2015 | Rensburg |
| 2016/0296918 | A1 | 10/2016 | Ha et al. |
| 2018/0037825 | A1 | 2/2018 | Ferguson et al. |

FOREIGN PATENT DOCUMENTS

| | | | |
|---|---|---|---|
| CN | 102781574 | A | 11/2012 |
| CN | 103160307 | A | 6/2013 |
| CN | 104174398 | A | 12/2014 |
| CN | 104815701 | A | 8/2015 |
| CN | 105582931 | A | 5/2016 |
| CN | 110494533 | A | 11/2019 |
| JP | 2006205019 | A | 8/2006 |
| JP | 2017029979 | A | 2/2017 |
| WO | 1993000993 | A1 | 1/1993 |
| WO | 2007093825 | A1 | 8/2007 |
| WO | 2010049715 | A1 | 5/2010 |
| WO | 2016091696 | A1 | 6/2016 |

OTHER PUBLICATIONS

Hui et al. "Effects of Noble Metal Promoters on Supported Cobalt-based Fischer-Tropsch Catalysts" Progress in Chemistry, vol. 21, No. 4, 2009, p. 622-628.
International Search Report for PCT/EP2021/050313, 4 pages, mailed Jul. 15, 2021.

* cited by examiner

PROCESS FOR PRODUCING A FISCHER-TROPSCH SYNTHESIS CATALYST AND FISCHER-TROPSCH START-UP PROCESS

This application is a national stage application under 35 U.S.C. § 371 of International Application No. PCT/EP2021/050313, filed Jan. 8, 2021, which claims priority to International Application No. PCT/EP2020/050586, filed Jan. 10, 2020, the disclosures of which are explicitly incorporated by reference herein.

This invention relates to a process for producing a Fischer-Tropsch synthesis catalyst. In particular, the invention relates to a process for preparing a reduced-and-passivated cobalt-containing Fischer-Tropsch catalyst in which from 15 to 40 mol. % of the cobalt thereon is in the form of cobalt oxide. The invention also relates to a start-up process for a reduced-and-passivated cobalt-containing Fischer-Tropsch catalyst in which from 15 to 40 mol. % of the cobalt on the catalyst is in the form of cobalt oxide.

The conversion of synthesis gas into hydrocarbons by the Fischer-Tropsch process has been known for many years. The growing importance of alternative energy sources has seen renewed interest in the Fischer-Tropsch process as one of the more attractive direct and environmentally acceptable routes to high quality transportation fuels.

Many metals, for example cobalt, nickel, iron, molybdenum, tungsten, thorium, ruthenium, rhenium and platinum are known to be catalytically active, either alone or in combination, in the conversion of synthesis gas into hydrocarbons and oxygenated derivatives thereof.

In the preparation of Fischer-Tropsch synthesis catalysts, a cobalt-containing compound, which may for instance be an organometallic or inorganic compound, is generally converted to form a cobalt oxide (for instance, $CoO$, $Co_2O_3$ or $Co_3O_4$) following a calcination/oxidation step. Following generation of the cobalt oxide, a reduction step is necessary in order to form the pure cobalt metal as the active catalytic species. Thus, the reduction step is also commonly referred to as an activation step.

Activation of Fischer-Tropsch catalysts at a commercial plant is both expensive and time consuming. Typically, catalysts are activated by reducing the metal under hydrogen at temperatures of more than 300° C. Reduced and activated catalysts are sensitive to oxidation in air and so activation using hydrogen is generally performed in situ on an oxidised catalyst before performing Fischer Tropsch synthesis. Catalysts can be passivated to reduce their reactivity by reducing the metal and subsequently oxidising the catalyst for transport and storage. The passivated catalyst may then be activated under hydrogen in situ before performing Fischer-Tropsch synthesis.

Additional equipment and capital expenditure are required in order to provide high temperature hydrogen reduction treatment for activating catalysts in situ at a commercial plant. Activation of a catalyst may generally be carried out on new catalysts every 1 to 5 years, with the hydrogen reduction equipment not required during the intervening operation of the Fischer-Tropsch process. Reduction of an oxidised catalyst with hydrogen also produces water, which may damage the activity of the catalyst downstream of where the water is produced in the catalyst bed. For this reason compressors are used to provide high flow rates in order to more quickly remove water as it is produced.

There remains a need for Fischer-Tropsch catalysts and processes that can avoid the infrequently used and expensive equipment and conditions associated with Fischer-Tropsch catalyst activation.

It has now been surprisingly found that by reducing a cobalt-containing Fischer-Tropsch catalyst and performing a controlled partial oxidation of the catalyst to give a reduced-and-passivated catalyst where from 15 to 40 mol. % of the cobalt on the catalyst is in the form of cobalt oxide, the catalyst may be advantageously activated using syngas rather than hydrogen and under milder conditions than are typically used.

Thus, an aspect of the present invention provides a process for producing a reduced-and-passivated cobalt-containing Fischer-Tropsch catalyst, the process comprising the following steps:

(a) contacting a cobalt-containing Fischer-Tropsch catalyst with a reducing gas under conditions suitable to produce a reduced cobalt-containing Fischer-Tropsch catalyst;

(b) under a non-oxidising atmosphere, adjusting the temperature of the reduced cobalt-containing Fischer-Tropsch catalyst to a temperature in the range of from 0° C. to 200° C.;

(c) contacting the reduced cobalt-containing Fischer-Tropsch catalyst with an oxygen-containing gas stream comprising from 0.1% v/v to 5% v/v oxygen with the balance being an inert gas, at a temperature in the range of from 0° C. to 200° C., in order to produce a reduced-and-passivated cobalt-containing Fischer-Tropsch catalyst;

wherein, in step (c), the amount of oxygen in the oxygen-containing gas stream, and the temperature, are selected and maintained to produce a reduced-and-passivated cobalt-containing Fischer-Tropsch catalyst wherein from 15 to 40 mol. % of the cobalt thereon is in the form of cobalt oxide.

By controlling the temperature and oxygen content of the gas stream used to passivate the catalyst, so as to produce a reduced-and-passivated cobalt-containing Fischer-Tropsch catalyst wherein from 15 to 40 mol. % of the cobalt thereon is in the form of cobalt oxide, a catalyst can be produced that may advantageously be activated under syngas in a Fischer-Tropsch reactor and/or under relatively mild conditions, whilst retaining catalyst activity.

Without wishing to be bound by any particular theory, it is believed that by providing a mild passivation of the catalyst by controlling the temperature and oxygen content of the oxidising gas stream to limit the cobalt oxide content to from 15 to 40 mol. %, the surface of the catalyst can be oxidised to protect the catalyst from oxidation during transport and storage whilst decreasing or avoiding oxidation of the bulk catalyst below the surface. It is believed that by avoiding such oxidation of the bulk catalyst below the surface, the typical requirements for reducing the catalyst under hydrogen at high temperatures can be avoided.

In step (a) of the process the cobalt-containing Fischer-Tropsch catalyst is reduced. The reduction may be carried out by any known means of which the skilled person is aware which is capable of converting cobalt oxide to the catalytically active cobalt metal. The reduction step may be carried out batch wise or continuously in a fixed bed, fluidised bed or slurry phase reactor. The reduction step may comprise contacting the cobalt-containing Fischer-Tropsch catalyst with a flow of hydrogen, for example a gas stream that consists essentially of hydrogen. In other instances the reduction step may be performed using a hydrogen stream comprising or consisting essentially of hydrogen in combination with an inert gas. Suitably the hydrogen stream may comprise at least 80% v/v hydrogen, preferably at least 90% v/v hydrogen, for example at least 95% v/v or at least 99% v/v hydrogen. The reduction may be carried out at a temperature of from 200° C. to 600° C., preferably from 300° C. to 500° C. The reduced cobalt-containing Fischer-Tropsch catalyst may preferably be reduced in step (a) such that no more than 10 mol. % of the cobalt on the catalyst is in the form of cobalt oxide, preferably such that no more than 5 mol % of the cobalt on the catalyst is in the form of cobalt oxide.

Step (b) of the process comprises, under a non-oxidising atmosphere, adjusting the temperature of the reduced cobalt-containing Fischer-Tropsch catalyst to a temperature in the range of from 0° C. to 200° C. Step (b) may last for any suitable length of time, which may be determined based on the time required to adjust the temperature of the catalyst to the desired value or range, for example the time to allow the catalyst to cool from the temperature used to perform reduction of the catalyst in step (a). In some instances once the temperature of the catalyst reaches the desired value or range, step (c) may be performed. In other instances, the catalyst may be stabilised at a desired temperature value or range for a period of time before step (c) is performed.

The non-oxidising atmosphere may comprise any suitable gas or mixture of gases. In some instances the non-oxidising atmosphere may be an atmosphere comprising at least in part the reducing gas used in step (a), for example the reducing atmosphere from part (a) may be maintained in step (b). In some instances, the non-oxidising atmosphere may be an inert atmosphere, for example an atmosphere consisting essentially of nitrogen and/or other inert gases such as argon, or a mixture of one or more inert gases with one or more reducing gases such as hydrogen. Preferably, the catalyst and reactor are purged with an inert gas before or during step (b), for example to remove residual hydrogen from the reactor.

The reduced cobalt-containing catalyst is contacted with an oxygen-containing gas stream in step (c). The oxygen-containing gas stream comprises from 0.1% v/v to 5% v/v oxygen with the balance being an inert gas. The inert gas may suitably be any inert gas or mixture of gases, for example the inert gas may be nitrogen or argon, preferably the inert gas is nitrogen.

Preferably the oxygen-containing gas stream comprises from 0.2% v/v to 2.5% v/v oxygen, for example from 0.3% v/v to 2% v/v oxygen or from 0.5% v/v to 2% v/v oxygen. In some preferred embodiments the oxygen-containing gas stream comprises 1% v/v or less oxygen, for example less than 1% v/v oxygen, or the oxygen-containing gas stream comprises 0.5% v/v or less oxygen, for example less than 0.5% v/v oxygen.

The reduced cobalt-containing Fischer-Tropsch catalyst is contacted with an oxygen-containing gas stream at a temperature in the range of from 0° C. to 200° C. in step (c). Preferably, the reduced cobalt-containing Fischer-Tropsch catalyst is contacted with the oxygen containing stream at a temperature of from 5° C. to 150° C., preferably from 10° C. to 100° C., more preferably from 20° C. to 80° C., for example from 30° C. to 60° C.

The catalyst may be heated by any suitable means. For example, the catalyst may be heated by external heaters arranged to apply heat to the catalyst, for example one or more electric heating elements or heat exchangers arranged to heat the catalyst and/or the gas flow over the catalyst may itself be heated.

The temperature that is selected and maintained in step (c) may be a temperature to which the catalyst is adjusted in step (b). It will be appreciated that an increase in temperature may result from the exothermic reaction of oxidising the reduced cobalt of the reduced cobalt-containing catalyst. Therefore, the temperature of the catalyst is preferably maintained within a temperate range, for example a temperature range as discussed previously. For example, in step (c) the temperature of the catalyst may be increased during step (c), but prevented from exceeding 200° C. Preferably, the temperature of the catalyst is prevented from exceeding 150° C., more preferably 100° C., most preferably 80° C., for example 60° C.

To control the temperature of the catalyst, the catalyst temperature may be lowered or an increase in temperature may be slowed or stopped to maintain a constant temperature. The temperature of the catalyst may be prevented from exceeding a particular temperature by any suitable means. For example, heating that is applied to the catalyst by a heater may be stopped or reduced, or the oxygen content of the oxygen-containing stream may be reduced. In some instances, the oxygen-containing stream may be diluted or replaced with an inert gas stream to prevent a temperature increase. In some instances, the catalyst may be actively cooled, for example using one or more heat exchangers arranged to draw heat from the catalyst, or by actively lowering the temperature of the oxygen-containing gas stream. In some instances, the flow rate of the oxygen containing gas stream over the catalyst may be increased to increase heat transfer away from the catalyst by the gas.

Without wishing to be bound by any particular theory, it is believed that when the temperature of the catalyst is not controlled, for example by selecting the oxygen content of the oxygen-containing gas stream and/or the applied temperature, exotherms during the passivation process can cause significant bulk oxidation of the cobalt on the catalyst in addition to surface oxidation. This causes an increase in the overall cobalt oxide content of the catalyst and may result in the need for high temperature reduction under hydrogen in order to activate the catalyst.

The amount of oxygen in the oxygen-containing gas stream, and the temperature in step (c) are selected to produce a reduced-and-passivated cobalt-containing Fischer-Tropsch catalyst wherein from 15 to 40 mol. % of the cobalt thereon is in the form of cobalt oxide. It has surprisingly been found that if the oxidation during the passivation step is controlled to give a reduced-and-passivated cobalt-containing Fischer-Tropsch catalyst wherein from 15 to 40 mol. % of the cobalt thereon is in the form of cobalt oxide, the catalyst may be activated under a flow of syngas, rather than a hydrogen stream, and/or under relatively mild conditions. This may allow the expense of hydrogen reduction equipment to be avoided in a commercial Fischer-Tropsch plant. The low level of oxidation may also avoid the need to compressors to provide high flow over the catalyst during reduction to remove water and prevent catalyst deactivation at the end of a catalyst bed.

In preferred embodiments, from 20 to 38 mol. % of the cobalt on the reduced-and-passivated cobalt-containing Fischer-Tropsch catalyst is in the form of cobalt oxide. Preferably, no more than 35 mol. % of the cobalt on the reduced-and-passivated cobalt-containing Fischer-Tropsch catalyst is in the form of cobalt oxide, for example no more than 33 mol. % or no more than 30 mol. %.

It will be appreciated that the temperature and oxygen content may be varied within the previously defined ranges in order to achieve the cobalt oxide content of the catalyst.

The cobalt oxide content of the reduced-and-passivated cobalt-containing Fischer-Tropsch catalyst may be determined by any suitable means, and such methods are known in the art.

For example, the cobalt oxide content of a reduced-and-passivated catalyst may be measured by temperature programmed reduction (hereafter referred to as TPR), which is well-known in the art. For example, a sample of the catalyst may be heated in a fixed bed tube reactor from low temperature (for example ambient temperature) in increasing steps up in temperature under a flow of a reducing gas such as hydrogen. The reducing gas may be diluted in an inert gas such as nitrogen, for example from 1% v/v to 20% v/v hydrogen in nitrogen, for example from 1% v/v to 10% v/v hydrogen in nitrogen. The temperature range may include from about ambient temperature, for example about 25° C., up to a maximum temperature where no further reduction of the catalyst is observed, for example up to around 550° C. or around 600° C. The amount of hydrogen that is consumed by the catalyst during reduction across the temperature profile is measured to indicate the amount of cobalt oxide that was present on the catalyst. This may be compared with the known total cobalt content of the catalyst in question to determine the proportion of cobalt on the catalyst in the the form of cobalt oxide. The amount of hydrogen consumed may for example be measured directly by comparing the hydrogen concentration after the catalyst to the hydrogen concentration in the gas fed to the catalyst, or amount of hydrogen consumed may be measured indirectly for example by measuring the amount of water generated from reduction of the cobalt oxides on the catalyst with hydrogen. Any suitable measurement apparatus may be used to measure hydrogen consumption, for example mass spectrometry or thermal conductivity detection.

For example, TPR analysis may be carried out using an analyser such as a Micromeritics 2920 AutoChem II analyser combined with an integrated thermal conductivity detector (TCD) and Cirrius 2 quadrupole mass spectrometer. Approximately 50 mg of catalyst sample may be loaded into a sample tube, for example a quartz glass U-tube, and dried under flowing inert gas such as nitrogen or argon. The sample may then be heated from room temperature to 110° C. at 5° C./min and held for 15 mins. The sample may then be cooled to room temperature under the inert atmosphere. TPR analysis may be carried out using, for example, 4% v/v hydrogen in argon (30 ml/min), and heating from room temperature to 550° C. at a rate of 5° C./min.

The amount of reduction can be measured as a function of temperature during the TPR test. Bulk oxidation of the catalyst may also be indicated by the presence of broad peaks in a TPR test for reduction taking place above 200° C. For example a broad peak in the range of about 200° C. to 300° C. may indicate reduction of bulk $Co_3O_4$ to CoO, while a broad peak in the range of about 300 to 500° C. may indicate reduction of bulk CoO to Co metal. In contrast, reduction of surface cobalt oxide may be observed as one or more relatively narrow peaks in the range of about 150 to 200° C. Preferably, in a TPR test the reduced-and-passivated cobalt-containing catalyst does not show reduction of the catalyst at temperatures higher than 250° C., more preferably 230° C., for example 200° C.

Surface oxidation of the catalyst may also be observed by X-Ray diffraction, in which for an over-oxidised catalyst, peaks can be observed that correspond to cobalt oxides, indicating bulk oxidation of cobalt in the catalyst. In instances where a surface passivated catalyst is prepared, cobalt oxide peaks in an X-Ray diffraction spectrum may not be present as only the bulk cobalt metal below the surface may be observed and not the layer of cobalt oxide on the surface.

In preferred embodiments, the amount of oxygen in the oxygen-containing gas stream, and the temperature, are selected by the steps of:

(i) performing steps (a) to (c) of the method for a Fischer-Tropsch catalyst having a given composition and under a given set of process conditions at a first temperature and using an oxygen-containing gas stream having a first oxygen content to produce a test catalyst;

(ii) determining the proportion of cobalt on the test catalyst that is in the form of cobalt oxide by performing temperature programmed reduction of the test catalyst;

(iii) if the proportion of cobalt on the test catalyst that is in the form of cobalt oxide is outside the range of from 15 to 40 mol. %, repeating steps (i) and (ii) at a second temperature, different to the first temperature, and/or a second oxygen content, different to the first oxygen content.

Preferably, a reduced-and-passivated catalyst may be prepared in step (i), and a test catalyst sample from that reduced-and-passivated catalyst is analysed in step (ii). It will be appreciated that the range of 15 to 40 mol. % in step (iii) may suitably be a preferred range as described previously herein.

Temperature programmed reduction, as recited in step (ii), is well-known in the art and may be performed as described previously herein. Alternatively, the proportion of cobalt on the test catalyst that is in the form of cobalt oxide may be determined by any other suitable method known to the person skilled in the art.

If the cobalt oxide content of the catalyst produced in step (i) is higher than the desired range of cobalt oxide content, steps (i) and (ii) may be repeated using a temperature lower than the first temperature, and/or an oxygen content of the oxygen-containing gas stream lower than the first oxygen content. Similarly, if the cobalt oxide content of the catalyst produced in step (i) is lower than the desired range of cobalt oxide content, steps (i) and (ii) may be repeated using a temperature higher than the first temperature, and/or an oxygen content of the oxygen-containing gas stream higher than the first oxygen content.

It will be appreciated that the catalyst used in repeating steps (i) and (ii) may be the same catalyst that was tested in step (ii) in the first instance, where that catalyst is then re-reduced and re-passivated under different conditions. Alternatively, the catalyst used in repeating steps (i) and (ii) may be a different but equivalent catalyst sample, for example a catalyst produced in the same way or from the same catalyst batch, or a mixture thereof.

Although the temperature and the oxygen content of the oxygen containing gas stream are mentioned, it will be appreciated that for a given temperature and oxygen content, other conditions may also influence the level of oxidation of the catalyst. Therefore, the conditions other than temperature and oxygen content of the oxygen-containing gas stream may be constant between step (i) and step (iii). For example, the GHSV of the oxygen-containing gas stream over the catalyst and/or the pressure of the oxygen-containing gas stream may be constant between step (i) and step (iii). Alternatively, the GHSV and/or the pressure may be respectively increased or decreased in addition to temperature and/or oxygen content of the oxygen-containing gas stream to control the level of oxidation.

Any suitable reactor may be used for the present process, and preferably steps (a) to (c) are performed sequentially in the same reactor by adjusting the flows of different gases to the reactor. For example, the process may be performed in a fixed bed, fluidised bed or slurry phase reactor. Preferably, in steps (a) to (c), the reducing gas, non-oxidising atmosphere and/or the oxygen containing stream are contacted with the cobalt-containing Fischer-Tropsch catalyst continuously in a fixed bed reactor.

Preferably, the oxygen containing stream is contacted with the reduced cobalt-containing Fischer-Tropsch catalyst at a GHSV of from 1000 to 30000 h$^{-1}$, preferably from 5000 to 10000 h$^{-1}$. Preferably, the GHSV of the oxygen-containing gas stream over the catalyst is more than 1000 h$^{-1}$, for example at least 2000 h$^{-1}$. Where the GHSV of the oxygen-containing gas stream over the catalyst is at a higher level during step (c), the flow rate may have a cooling effect on the catalyst and lead to reduced exotherms and decrease the likelihood of over-oxidation.

Preferably, the contacting step is conducted at a pressure of from 1 bar absolute to 31 bar absolute, preferably from 1 bar absolute to 6 bar absolute, most preferably at about atmospheric pressure. At higher pressures, the oxidation of the reduced catalyst may be accelerated, which may in some instances lead to increased exotherms and to over-oxidation of the passivated catalyst.

The contacting step (c) may be performed for any suitable length of time to allow for the desired oxidation of the catalyst. For example, the contacting step (c) may be performed for from 5 minutes to 168 hours, from 5 minutes to 120 hours, from 5 minutes to 72 hours, from 5 minutes to 48 hours, or preferably from 5 minutes to 24 hours. Preferably, the contacting step (c) is performed for at least 15 minutes, preferably at least 30 min, for example at least 45 minutes, or at least 1 hour. In some preferred embodiments, the contacting step (c) is performed for from 30 minutes to 4 hours, for example from 30 minutes to 2 hours.

Once the reduced-and-passivated catalyst has been produced, the catalyst may be stable for storage without significant loss of activity, for example storage for at least several weeks or several months, depending on storage conditions. Preferably, the reduced-and-passivated cobalt-containing Fischer-Tropsch catalyst is stored under a dry atmosphere, more preferably under an inert atmosphere such as under a nitrogen or argon atmosphere.

In some embodiments, the reduced-and-passivated cobalt-containing Fischer-Tropsch catalyst may be coated with wax or hydrocarbons, which may enhance the stability of the catalyst.

The cobalt-containing catalyst for use in accordance with the process of the invention may be a freshly prepared catalyst material. Alternatively, the cobalt-containing catalyst may be obtained from a cobalt-containing material which has previously been used for catalyzing a Fischer-Tropsch reaction. If necessary, the cobalt-containing material which has previously been used for catalyzing a Fischer-Tropsch reaction may suitably be reduced and/or calcined prior to being used in the present process.

The cobalt-containing Fischer-Tropsch catalyst may be unsupported or preferably supported on a conventional refractory support material. For example, the reduced cobalt-containing Fischer-Tropsch catalyst is preferably supported on a support material selected from the list consisting of silica, alumina, silica/alumina, ceria, titania, gallia, zirconia, magnesia, zinc oxide and mixtures thereof, preferably selected from titania, zinc oxide, ceria, alumina or zirconia and mixtures thereof, more preferably titania.

The level of cobalt loading on support material may be any suitable loading. Preferably, the loading of cobalt on the support material may be from 5 to 25 wt. % cobalt based on the weight of the reduced catalyst, in particular the loading of cobalt on the support material may be from 10 to 15 wt. %.

Preferred support materials are substantially free of extraneous components which might adversely affect the catalytic activity of the system. Thus, preferred support materials are at least 95 wt. % pure, more preferably at least 98 wt. % pure and most preferably at least 99 wt. % pure. It will be appreciated that purity of the support may refer generally to the composition of the support material, and different phases of the material may still be present. For example the support may be pure in that it comprises a particular proportion of a material, for example titania or alumina, but may contain different phases of that material, for example anatase and rutile phases of titania or alpha, delta, gamma phases of alumina. Impurities preferably amount to less than 1 wt. %, more preferably less than 0.50 wt. % and most preferably less than 0.25 wt. %. The pore volume of the support is preferably more than 0.150 ml/g and more preferably more than 0.25 ml/g, for example more than 0.5 ml/g. The average pore diameter (prior to impregnation) of the support material may be 10 to 500 Å, preferably 15 to 100 Å, more preferably 20 to 80 Å and most preferably 25 to 40 Å. The BET surface area is suitably from 2 to 1000 m$^2$/g, preferably from 10 to 600 m$^2$/g, more preferably from 15 to 100 m$^2$/g, and most preferably 30 to 60 m$^2$/g.

The BET surface area, pore volume, pore size distribution and average pore diameter may be determined from the nitrogen adsorption isotherm determined at 77K using a Micromeritics TRISTAR 3000 static volumetric adsorption analyser. A procedure which may be used is an application of British Standard methods BS4359: Part 1:1984 'Recommendations for gas adsorption (BET) methods' and BS7591: Part 2:1992, 'Porosity and pore size distribution of materials'—Method of evaluation by gas adsorption. The resulting data may be reduced using the BET method (over the pressure range 0.05-0.20 P/Po) and the Barrett, Joyner & Halenda (BJH) method (for pore diameters of 20-1000 Å) to yield the surface area and pore size distribution respectively.

Suitable references for the above data reduction methods are Brunauer, S, Emmett, P H, & Teller, E, J. Amer. Chem. Soc. 60, 309, (1938) and Barrett, E P, Joyner, L G & Halenda P P, J. Am Chem. Soc., 1951 73 373-380.

The supported cobalt-containing Fischer-Tropsch catalyst used in step (a) may be prepared by any suitable method of which the skilled person is aware. For example, it may be prepared by impregnation, precipitation or gelation. A suitable Fischer-Tropsch catalyst may also be prepared by mulling or kneading a support material, such as silica, alumina, silica/alumina, ceria, titania, gallia, zirconia, magnesia or zinc oxide, with either of a soluble or insoluble cobalt compound, before extruding, drying and calcining the product.

A suitable impregnation method, for example, comprises impregnating a support material with a compound of cobalt which is thermally decomposable to the oxide form. Any suitable impregnation technique including the incipient wetness technique or the excess solution technique, both of which are well-known in the art, may be employed. The incipient wetness technique is so-called because it requires that the volume of impregnating solution be predetermined so as to provide the minimum volume of solution necessary to just wet the entire surface of the support, with no excess liquid. The excess solution technique as the name implies, requires an excess of the impregnating solution, the solvent being thereafter removed, usually by evaporation.

The impregnation solution may suitably be either an aqueous solution or a non-aqueous, organic solution of the thermally decomposable cobalt compound. Suitable non-aqueous organic solvents include, for example, alcohols, ketones, liquid paraffinic hydrocarbons and ethers. Alternatively, aqueous organic solutions, for example an aqueous alcoholic solution, of the thermally decomposable cobalt compound may be employed.

Suitable soluble compounds include for example the nitrate, acetate or acetylacetonate, preferably the nitrate, of cobalt. It is preferred to avoid the use of the halides of cobalt because these may be detrimental to the catalyst.

Impregnation may be conducted with a support material which is in a powder, granular or pelletized form. Alternatively, impregnation may be conducted with a support material which is in the form of a shaped extrudate.

Where a preformed support or an extrudate is impregnated, it will be appreciated that the support may be contacted with the impregnating solution by any suitable means including, for instance, vacuum impregnation, incipient wetness or immersion in excess liquid.

Where a powder or granulate of support material is impregnated, the powder or granulate may be admixed with the impregnating solution by any suitable means of which the skilled person is aware, such as by adding the powder or granulate to a container of the impregnating solution and stirring. Where an extrusion step immediately follows impregnation of a powder or granulate, the mixture of powder or granulate and impregnating solution may be further processed if it is not already in a form which is suitable for extruding. For instance, the mixture may be mulled to reduce the presence of larger particles that may not be readily extruded, or the presence of which would otherwise compromise the physical properties of the resulting extrudate. Mulling typically involves forming a paste which is suitable for shaping by extrusion. Any suitable mulling or kneading apparatus of which the skilled person is aware may be used for mulling in the context of the present invention. For example, a pestle and mortar may suitably be used in some applications or a Simpson muller may suitably be employed. Mulling is typically undertaken for a period of from 3 to 90 minutes, preferably for a period of 5 minutes to 30 minutes. Mulling may suitably be undertaken over a range of temperatures, including ambient temperatures. A preferred temperature range for mulling is from 15° C. to 50° C. Mulling may suitably be undertaken at ambient pressures. It will be appreciated that complete removal of bound solvent from the impregnation solution may be conducted to effect complete precipitation after extrusion.

In embodiments where a calcination step is performed on an impregnated powder or granulate, thereby completely removing solvent of the impregnation solution, the calcined powder or granulate may also be further processed in order to form a mixture which is suitable for extruding. For instance, an extrudable paste may be formed by combining the calcined powder or granulate with a suitable solvent, for example a solvent used for impregnation, preferably an aqueous solvent, and mulled as described above.

In some embodiments, an extrudate or preformed support is converted into a powder or granulate. This may be achieved by any suitable means of which the person of skill in the art is aware. For instance, the impregnated support material, which may in some embodiments be a dry extrudate, may be crushed and/or ground/milled. In preferred embodiments, the powder which is formed has a median particle size diameter (d50) of the less than 50 μm, preferably less than 25 μm. Where a granulate is instead formed, the median particle size diameter (d50) of the granulate is preferably from 300 to 600 μm. Particle size diameter (d50) may suitably be determined by means of a particle size analyser (e.g. Microtrac S3500 Particle size analyser).

A suitable precipitation method for producing the cobalt-containing catalyst comprises, for example, the steps of: (1) precipitating at a temperature in the range from 0° C. to 100° C. cobalt in the form of an insoluble thermally decomposable compound thereof using a precipitant comprising ammonium hydroxide, ammonium carbonate, ammonium bicarbonate, a tetraalkylammonium hydroxide or an organic amine, and (2) recovering the precipitate obtained in step (1).

In contrast to impregnation methods, any soluble salt of cobalt may be employed. Suitable salts include, for example, carboxylates, chlorides and nitrates. It is preferred to use aqueous solutions of the cobalt salt(s), although aqueous alcoholic solutions for example may be employed if desired.

As regards the precipitant, in addition to ammonium carbonate, ammonium bicarbonate and ammonium hydroxide, tetraalkylammonium hydroxides and organic amines may also be used. The alkyl group of the tetraalkylammonium hydroxide may suitably be a $C_1$ to $C_4$ alkyl group. A suitable organic amine is cyclohexylamine. Experiments have shown that the use of alkali metal precipitants may lead to very much inferior catalysts. It is therefore preferred to avoid the presence of alkali metals in the catalyst composition. Compositions free from alkali metal may suitably be produced using as the precipitant either ammonium carbonate or ammonium bicarbonate, even more preferably ammonium bicarbonate. Ammonium carbonate may suitably be used in a commercially available form, which comprises a mixture of ammonium bicarbonate and ammonium carbonate. Instead of using a pre-formed carbonate or bicarbonate it is possible to use the precursors of these salts, for example a soluble salt and carbon dioxide.

Irrespective of the method for preparing the cobalt-containing material, the cobalt-containing material may be converted into a catalyst comprising cobalt in the oxide form, for subsequent reduction in accordance with the present process. Calcination may be used to afford a catalyst comprising cobalt in the oxide form by, for instance, causing thermal-decomposition of a thermally decomposable compound of cobalt formed previously. Calcination may be performed by any method known to those of skill in the art, for instance in a fluidized bed or rotary kiln at a temperature suitably in the range from 200° C. to 700° C. In some embodiments, calcination may be conducted as part of an integrated process before reduction is performed in the same reactor in step (a).

The crystallite size of cobalt oxide crystallites on the calcined catalyst may be below a desired upper limit of particle size (e.g. below 20 nm, preferably below 16 nm, for example below 12 nm or below 10 nm) or to ensure that the cobalt oxide crystallite size of crystallites impregnated on the support material is substantially within a desired range of particle sizes (e.g. between 6 to 12 nm, preferably 7 to 10 nm, for example about 8 nm).

In preferred embodiments, the cobalt-containing Fischer-Tropsch catalyst may comprise one or more promoters, dispersion aids, strength aids and/or binders.

Preferably, the cobalt-containing Fischer-Tropsch catalyst comprises one or more promoters, preferably selected from the list consisting of ruthenium, palladium, platinum, rhodium, rhenium, manganese, chromium, nickel, iron, molybdenum, boron, tungsten, zirconium, gallium, thorium, lanthanum, cerium and mixtures thereof, preferably selected from manganese, rhenium, ruthenium and mixtures thereof.

Promoters may be used in a cobalt to promoter atomic ratio of up to 250:1 and more preferably up to 125:1, for example up to 25:1 or up to 10:1. A promoted catalyst may be prepared by a variety of methods including impregnation, extrusion, precipitation or gelation.

The promoter may be added at one or more of the catalyst preparation stages including: during precipitation as a soluble compound; precipitation by incipient wetness impregnation; or following calcination of the cobalt comprising precipitate.

The cobalt-containing catalyst may also be a composition additionally comprising zinc oxide, as described, for instance, in U.S. Pat. No. 4,826,800. Such a composition is preferably made by the preferred process described therein.

A further aspect provides a process for producing a reduced-and-passivated cobalt-containing Fischer-Tropsch catalyst, the process comprising:

contacting a reduced cobalt-containing Fischer-Tropsch catalyst at a temperature of at least 0° C. with an oxygen containing gas stream comprising an inert gas and from 0.1% v/v to 5% v/v oxygen; and wherein the temperature of the catalyst is increased during the contacting step, but prevented from exceeding 200° C.

By use of the above process, it may be possible to avoid substantial bulk oxidation of the cobalt on the catalyst during passivation. For example, a reduced-and-passivated cobalt-containing Fischer-Tropsch catalyst may be produced where from 15 to 40 mol. % of the cobalt on the reduced-and-passivated cobalt-containing Fischer-Tropsch catalyst is in the form of cobalt oxide. Preferably from 20 to 38 mol. % of the cobalt on the reduced-and-passivated cobalt-containing Fischer-Tropsch catalyst is in the form of cobalt oxide, for example, where no more than 35 mol. % of the cobalt on the reduced-and-passivated cobalt-containing Fischer-Tropsch catalyst is in the form of cobalt oxide, for example no more than 33 mol. % or no more than 30 mol. % of the cobalt on the reduced-and-passivated cobalt-containing Fischer-Tropsch catalyst is in the form of cobalt oxide.

Preferably, the process comprises contacting a reduced cobalt-containing Fischer-Tropsch catalyst at a temperature of at least 5° C., at least 10° C., at least 20° C., or more preferably at least 30° C.

Preferably, the temperature of the catalyst is prevented from exceeding 150° C., more preferably 100° C., most preferably 80° C., for example 60° C.

It will be appreciated that the reduced cobalt-containing Fischer Tropsch catalyst, the oxygen containing gas stream and the conditions during the contacting step may be substantially as defined previously herein.

A further aspect provides a reduced-and-passivated cobalt-containing Fischer-Tropsch catalyst produced by the processes as defined previously herein.

A reduced-and-passivated Fischer-Tropsch catalyst as described previously herein may advantageously be activated for Fischer-Tropsch synthesis in a reactor under a flow of syngas. As will be appreciated, Fischer-Tropsch synthesis relates to the heterogeneously catalysed production of hydrocarbons from syngas, for example in the production of a diesel or aviation fuel or precursors thereof. By way of example, Fischer-Tropsch synthesis of alkanes from syngas may be represented by Equation 1:

$$mCO + (2m+1)H_2 \rightarrow mH_2O + C_mH_{2m+2} \qquad \text{Equation 1}$$

Typically, a cobalt-containing Fischer-Tropsch catalyst comprising cobalt in the form of cobalt oxide is activated by reduction to cobalt metal under a stream of hydrogen at a temperature of greater than 300° C., and in some instances greater than 400° C. However, by providing a reduced-and-passivated cobalt-containing Fischer-Tropsch catalyst where from 15 to 40 mol. % of the cobalt on the reduced-and-passivated cobalt-containing Fischer-Tropsch catalyst is in the form of cobalt oxide, it has been surprisingly found that activation of the catalyst for Fischer-Tropsch synthesis may be performed under a syngas stream rather than a hydrogen stream, and at milder conditions than are typically used.

In a further aspect, there is provided a start-up process for a Fischer-Tropsch catalyst, the start-up process comprising the steps of:

(a) providing a reduced-and-passivated cobalt-containing Fischer-Tropsch catalyst, wherein from 15 to 40 mol. % of the cobalt on the catalyst is in the form of cobalt oxide;

(b) contacting the catalyst from step (a) with a syngas gas stream under conditions suitable to activate the catalyst for Fischer-Tropsch synthesis;

(c) optionally adjusting the temperature to the desired reaction temperature for performing Fischer-Tropsch synthesis with the activated catalyst from step (b).

By providing a reduced-and-passivated cobalt-containing Fischer-Tropsch catalyst, wherein from 15 to 40 mol. % of the cobalt on the catalyst is in the form of cobalt oxide, and activating the catalyst with a syngas gas stream, the infrequently used and expensive hydrogen reduction equipment and conditions associated with typical catalyst activation may be avoided whilst retaining catalyst activity.

It has also been surprisingly found that more uniform activity across the catalyst bed may be achieved following activation. Without wishing to be bound by any particular theory, it is believed that in the present start-up process, less water is produced during the activation of the catalyst, which reduces the effect of water from activation of an upstream end of the catalyst bed reducing the activity of the catalyst at the downstream end of the catalyst bed. In this way, compressors that are typically used to provide high flow rates in order to more quickly remove water as it is produced during activation of the catalyst may be avoided. Further, without wishing to be bound by any particular theory, since it is believed that in the present start-up process less water is produced during the activation of the catalyst, which reduces the effect of water from activation of an upstream end of the catalyst bed reducing the activity of the catalyst at the downstream end of the catalyst bed, the present start-up process may provide a Fischer-Tropsch process which has increased productivity and/or selectivity compared to Fischer-Tropsch processes which are subjected to a start-up process using a typical catalyst activation, and may also provide a Fischer-Tropsch process which has increased catalyst life compared to Fischer-Tropsch processes which are subjected to a start-up process using a typical catalyst activation.

The reduced-and-passivated cobalt-containing Fischer-Tropsch catalyst used in the present start-up process may be prepared by any suitable process, provided that from 15 to 40 mol. % of the cobalt on the catalyst is in the form of cobalt oxide. In particular, the reduced-and-passivated cobalt-containing Fischer-Tropsch catalyst may suitably be produced by the processes defined previously herein.

Thus, the reduced-and-passivated cobalt-containing Fischer-Tropsch catalyst used in the present start-up process may be substantially as defined previously herein, in relation to the physical properties and composition of the catalyst defined previously herein, and/or in relation to the methods of production. For example, while in some instances the reduced-and-passivated cobalt-containing Fischer-Tropsch catalyst used in the present start-up process may be produced by the processes defined previously herein, in some instances the steps of reduction and passivation may differ from those defined previously.

It will also be appreciated that a reduced-and-passivated cobalt-containing Fischer-Tropsch catalyst used in the present start-up process may be produced in a different location to where the start-up process and Fischer-Tropsch synthesis is performed, and transported to a plant where the start-up process is performed following production of the reduced-and-passivated cobalt-containing Fischer-Tropsch catalyst. For example, the reduced-and-passivated cobalt-containing Fischer-Tropsch catalyst may be stored under a dry or inert atmosphere during transportation as described previously herein.

In addition to activating the catalyst under a syngas stream, the activation of the present start-up process may advantageously be performed at lower temperatures than are typically used in Fischer-Tropsch catalyst activations. Thus, in preferred embodiments step (b) of the start-up process is performed at a temperature of less than 350° C., preferably less than 300° C., more preferably less than 250° C.

The syngas used in the present start-up process may be any suitable syngas stream. In preferred embodiments, the syngas stream in step (b) comprises hydrogen and carbon monoxide in a $H_2$:CO ratio of from about 1:1 to about 10:1, for example about 1:1 to about 8:1 or 1:1 to about 5:1. In some preferred embodiments, the syngas stream in step (b) comprises hydrogen and carbon monoxide in a $H_2$:CO ratio of from about 0.8:1 to about 3:1, preferably from about 1:1 to about 2.5:1, for example from about 1.5:1 to 2:1. Advantageously, the catalyst activation step may be performed using a syngas stream have the same composition as the syngas that may subsequently be used for Fischer-Tropsch synthesis on the catalyst. In other embodiments, the syngas stream in step (b) may be different in composition to that used in subsequent Fischer-Tropsch synthesis.

The syngas stream used in step (b) of the start-up process may consist essentially of syngas, or may be diluted. In some preferred embodiments, syngas stream used in step (b) comprises syngas diluted with an inert gas, preferably nitrogen. For example, the syngas stream in step (b) may comprise or consist essentially of syngas and an inert gas, wherein syngas makes up at least 20% v/v of the stream, preferably at least 30% v/v, for example at least 40% v/v.

In step (b) of the start-up process, the syngas stream may be contacted with the catalyst at any suitable flow rate, for example at a GHSV of from 100 to 15000 $h^{-1}$. Preferably, in step (b) the syngas stream is contacted with the catalyst at a GHSV of from 500 to 12000 $h^{-1}$, more preferably from 3000 to 10000 $h^{-1}$. As less water may be produced by reduction of the catalyst during the present start-up process in comparison to a typical Fischer-Tropsch catalyst reduction, relatively lower flow rates may be used as there is not such a need to drive off the water produced.

The pressure of the syngas stream in step (b) of the start-up process may be any suitable pressure, and may be substantially the same pressure that is desired for subsequent Fischer-Tropsch synthesis using the activated catalyst. For example, the pressure of the syngas stream in step (b) may comprise a pressure that increases with time to raise the pressure from atmospheric pressure to the pressure that is desired for subsequent Fischer-Tropsch synthesis. Preferably, in step (b) the syngas stream is contacted with the catalyst at a pressure of from atmospheric pressure to 51 bar absolute, preferably from 6 bar to 51 bar absolute.

Preferably, less than 20 mol. % of the cobalt on the activated catalyst from step (b) of the start-up process is in the form of cobalt oxide, more preferably less than 10 mol. %, for example less than 5 mol. %.

In step (c) of the start-up process, the temperature is optionally adjusted to the desired reaction temperature for performing Fischer-Tropsch synthesis with the activated catalyst from step (b). It will be appreciated that as the present start-up process may be conducted at relatively low temperature, the temperature at which step (b) is conducted may suitably be substantially the same as the temperature that is used in subsequent Fischer-Tropsch synthesis. In this way, no specific temperature change may be required from the activation of the catalyst to performing Fischer-Tropsch synthesis. In some preferred embodiments, step (b) may comprise contacting the catalyst from step (a) with a syngas gas stream whilst performing a suitable temperature ramping process to bring the catalyst to a desired temperature for subsequently performing Fischer-Tropsch synthesis. For example, catalyst temperature may be increased to about 150° C. and subsequently increased incrementally from 150° C. to 160° C. at a rate of 60° C./h, from 160 to 180 at a rate of 10° C./h, from 180 to 190 at a rate of 5° C./h before a final increase at 1° C./h to reach the desired temperature and/or level of CO conversion.

In preferred embodiments, in step (c) of the start-up process, the temperature is adjusted to a temperature of from 100° C. to 400° C., preferably from 150 to 350° C., and more preferably from 150 to 250° C. In some preferred embodiments the temperature is maintained at a temperature used in step (b), for example a temperature resulting from a temperature ramping process in step (b).

In some embodiments, the start-up process further comprises the step of performing Fischer-Tropsch synthesis using the activated catalyst from step (b).

The start-up process and/or a subsequent Fischer-Tropsch process following the start-up process is preferably carried out continuously in a fixed bed, fluidised bed or slurry phase reactor. In some or all embodiments, the Fischer-Tropsch process which is performed using the cobalt-containing Fischer-Tropsch catalyst is a fixed bed Fischer-Tropsch process. When using the cobalt-containing Fischer-Tropsch catalyst in a fixed bed process the particle size may be of such shape and dimension that a suitable pressure drop over the catalyst bed is achieved. A person skilled in the art is able to determine the particle dimension optimal for use in such fixed bed reactors. Particles of the desired shape and dimension may for example be obtained by extrusion of a slurry to which optionally extrusion aids and/or binders may be added.

Fischer-Tropsch synthesis using the activated catalyst may be performed under any suitable conditions. By way of example, the volume ratio of hydrogen to carbon monoxide in the syngas is preferably in the range of from 0.5:1 to 5:1, more preferably from 1:1 to 3:1, and most preferably 1.5:1 to 2.5:1. The syngas stream during the Fischer Tropsch synthesis may be the same as is used in step (b) of the start-up process defined previously also comprise other gaseous components, such as nitrogen, carbon dioxide, water, methane and other saturated and/or unsaturated light hydrocarbons, each preferably being present at a concentration of less than 30% by volume. The temperature of the Fischer-Tropsch reaction is preferably in the range from 100 to 400° C., more preferably from 150 to 350° C., and most preferably from 150 to 250° C. The pressure is preferably in the range from atmospheric pressure to 100 bar absolute, more preferably from 5 to 75 bar absolute, and most preferably from 10 to 50 bar absolute.

While the present start-up process may advantageously be performed using a syngas stream to activate the catalyst, hydrogen may also be used to activate the catalyst under milder conditions than are typically used. Thus, a further aspect provides a start-up process for a Fischer-Tropsch catalyst, the start-up process comprising the steps of:

(a) providing a reduced-and-passivated cobalt-containing Fischer-Tropsch catalyst, wherein from 15 to 40 mol. % of the cobalt on the catalyst is in the form of cobalt oxide;

(b) contacting the catalyst from step (a) with a reducing gas stream at a temperature of less than 300° C. under conditions suitable to activate the catalyst for Fischer-Tropsch synthesis;

(c) optionally adjusting the temperature to the desired reaction temperature for performing Fischer-Tropsch synthesis with the activated catalyst from step (b).

Aside from using a reducing gas in place of syngas specifically, the start-up process may be substantially as defined previously herein.

Preferably, the reducing gas is hydrogen. For example the reducing gas stream may comprise at least 80% v/v hydrogen, preferably at least 90% v/v hydrogen, for example the reducing gas may consist essentially of hydrogen.

In preferred embodiments, the temperature at which the catalyst from step (a) is contacted with a reducing gas stream in step (b) may be less than 250° C.

A further aspect provides the use of a reduced-and-passivated cobalt-containing Fischer-Tropsch catalyst as defined previously herein for improving CO conversion and/or productivity in a Fischer-Tropsch synthesis process, wherein the reduced-and-passivated catalyst is activated by contacting the catalyst with a syngas stream and/or at a temperature of less than 300° C. Preferably the use comprises activating the catalyst under process conditions as defined previously herein.

The present invention will now be described by reference to the following non-limiting examples and the accompanying Figures, in which.

EXAMPLES

Catalyst Synthesis and Passivation

Figure 1:
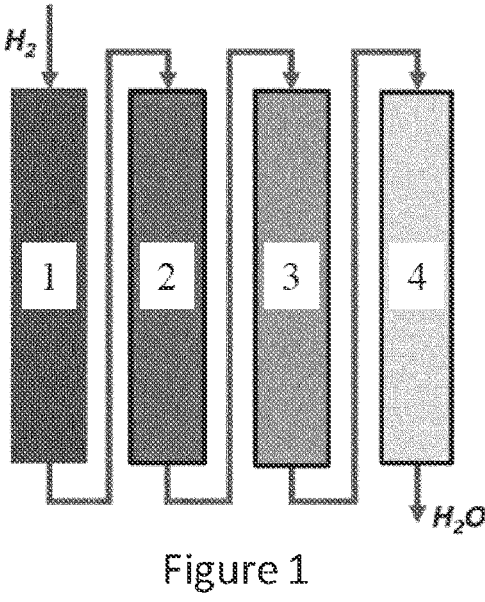
FIG. 1 shows schematically an arrangement of four catalyst beds connected in series for reducing the catalyst.

The initial catalyst material was prepared by impregnation of a P25 titania support with a solution containing cobalt nitrate hexahydrate and manganese acetate tetrahydrate to give a catalyst material comprising 10 wt. % cobalt and 1 wt. % manganese on the support. The support material was shaped and impregnated with the active components, then dried and calcined.

A series of catalysts were passivated according to Table 1 below. The catalysts were prepared using the above catalyst material by first contacting 10 g of catalyst in a fixed bed tubular reactor with a 100% hydrogen stream at 300° C. and at atmospheric pressure for 15 hours to reduce the cobalt on the catalyst material, followed by adjustment to the specified temperature. The catalysts were then contacted with an oxygen-containing gas stream at a GHSV of 2000 $h^{-1}$ and at atmospheric pressure for 2 hours. The temperature of the catalysts was monitored by a thermocouple in the catalyst bed.

The catalyst samples were then analysed by temperature programmed reduction (TPR) to determine the proportion of cobalt oxide that was present in the catalyst samples. The TPR test was conducted on an approximately 50 mg catalyst sample using a Micromeritics 2920 AutoChem II analyser combined with an integrated thermal conductivity detector (TCD) and Cirrius 2 quadrupole mass spectrometer. The sample was loaded into a quartz glass U-tube and dried under flowing argon, heating from room temperature to 110° C. at 5° C./min and holding the temperature for 15 mins. Samples were then cooled to room temperature under argon. TPR analysis was carried out using 4% v/v hydrogen in argon (30 ml/min), and heating from room temperature to 550° C. at a rate of 5° C./min.

TABLE 1

| | Temperature (° C.) | $O_2$ content (%) | Exotherm peak (° C.) | Co oxide (%) |
|---|---|---|---|---|
| Example 1 | 30 | 0.5 | 45 | 30 |
| Example 2 | 30 | 1.0 | 73 | 31 |
| Example 3 | 60 | 0.25 | 84 | 37 |
| Example 4 (comparative) | 90 | 0.25 | 120 | 41 |
| Example 5* | 90 | <0.25 | — | 31 |

\*= Example 5 catalyst was a 10 g catalyst bed arranged downstream of and in series with the catalyst in Example 4, resulting in a stream having an oxygen content of less than 0.25% to the downstream catalyst As can be seen in Table 1, temperature and oxygen content of the oxygen-containing stream may be varied to vary the proportion of cobalt oxide on the reduced-and-passivated catalyst.

Fischer-Tropsch Synthesis

Example 6 (Comparative)

1.5 ml of a calcined catalyst, not passivated according to the above procedure, was charged into a microreactor and reduced under a Hz stream (15 h, 300° C., 100% Hz, 1 bar absolute, GHSV of 5000 $h^{-1}$). After cooling, the gas stream over the catalyst was switched to a mixture of syngas ($H_2$/CO=1.8) and 60% nitrogen and the pressure maintained at 43 bar absolute. The temperature was ramped at 10° C./hour from 130° C. until approximately 60% CO conversion was reached (about 215° C.).

Example 7

The procedure of Example 6 was followed, except passivated catalysts according to Examples 1 and 5 were used and no reduction under hydrogen was carried out before contacting the catalyst with the syngas stream and ramping the temperature at 10° C./hour from 130° C. to approximately 215° C.

Table 2 shows the results of the Fischer-Tropsch synthesis at steady state after around 400 to 450 hours on stream for the catalysts of Examples 1 and 5, and Example 6.

TABLE 2

| Catalyst | Applied Temperature (° C.) | CO Conversion (%) | CH$_4$ selectivity (%) | C$_{5+}$ selectivity (%) |
|---|---|---|---|---|
| Example 6 (comparative) | 215 | 60.7 | 5.5 | 88.0 |
| Example 1 | 216 | 60.5 | 5.3 | 88.0 |
| Example 5 | 215 | 62.5 | 6.2 | 87.6 |

As can be seen in Table 2, the reduced and passivated catalysts activated under the syngas stream used in the Fischer-Tropsch reaction surprisingly show comparable activity to a catalyst reduced with hydrogen in situ.

A further Fischer-Tropsch reaction was also conducted using a further catalyst passivated according to the above procedure which had a cobalt oxide content of 39%. The catalyst was found to be active for Fischer-Tropsch synthesis, but to show comparatively less activity than the catalysts of Examples 1 and 5 above.

Catalyst Bed Uniformity Test

An arrangement of four connected catalyst beds was used to test catalyst bed uniformity for a calcined cobalt-containing catalyst and a reduced-and-passivated catalyst according to the present disclosure (a calcined catalyst reduced under 50% H$_2$/N$_2$, GHSV 8000 hr$^{-1}$, atmospheric pressure, 300 C; then passivated under 1% O$_2$/N$_2$ at <30° C.). Three tests were performed as shown in Table 3 below, according to the below general procedure. One test was performed using a calcined catalyst activated under 100% H$_2$ (Example 8), a further test using a calcined catalyst activated under 50% H$_2$/N$_2$ (Example 9), and a final test using the reduced and passivated catalyst activated under 50% H$_2$/N$_2$ (Example 10).

Catalyst Activation

The catalyst was loaded into four fixed beds connected in series as shown in FIG. 1. To reduce the cobalt on the catalysts, a hydrogen containing stream (either 100% H$_2$ or 50% H$_2$/N$_2$) was passed over the catalyst beds from catalyst bed 1 through beds 2 to 4 (GHSV 8000 h$^{-1}$, 1 bar absolute, 300° C.).

Fischer-Tropsch Synthesis

Figure 2:
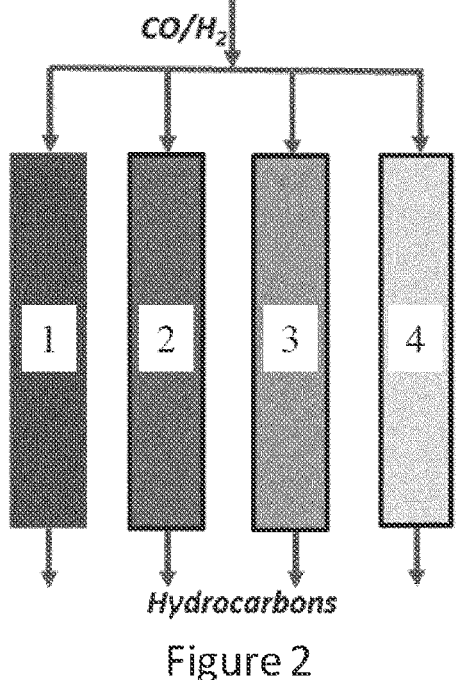
FIG. 2 shows a schematically an arrangement of four catalyst beds connected in parallel for performing Fischer-Tropsch synthesis.

After performing the above activation and cooling the catalyst beds, a mixture of syngas (H$_2$/CO=1.8) in 51% nitrogen was fed to the catalyst beds separately in parallel as shown in FIG. 2 (GHSV 8795 h$^{-1}$, 31 bar absolute). In this way, it was possible to analyse the activity of each of the catalyst beds tin relation to its relative position during activation. The temperature was ramped to 215° C. and the CO conversion at steady state at 215° C. was recorded for each of the four catalyst beds and is shown in Table 3 below. The temperature at each catalyst bed that was required to reach matching conversion was also measured, and is shown in Table 3 below.

TABLE 3

| | | CO conversion (%)/Catalyst bed | | | |
|---|---|---|---|---|---|
| | Activation | 1 | 2 | 3 | 4 |
| Example 8 | 100% H$_2$ | 38.0 | 30.5 | 25.6 | 27.3 |
| Example 9 | 50% H$_2$/N$_2$ | 38.3 | 29.8 | 26.6 | 25.1 |
| Example 10 | 50% H$_2$/N$_2$ | 37.2 | 38.1 | 39.7 | 35.9 |

| | | Reactor temperature to reach matching conversion (° C.)/Catalyst bed | | | |
|---|---|---|---|---|---|
| | | 1 | 2 | 3 | 4 |
| Example 8 | 100% H$_2$ | 215 | 219 | 222 | 221 |
| Example 9 | 50% H$_2$/N$_2$ | 219 | 224 | 227 | 228 |
| Example 10 | 50% H$_2$/N$_2$ | 217 | 217 | 216 | 218 |

As can be seen from Table 3, where a catalyst that is reduced-and-passivated according to the present disclosure is used (Example 10), the activity across the four catalyst beds is more uniform than where a calcined catalyst is used. By analogy, a reactor using a single catalyst bed may also be expected to show the same trend of improved catalyst bed uniformity from the upstream end of the bed to the downstream end.

Without wishing to be bound by any particular theory, it is believed that by using a reduced-and-passivated catalyst in accordance with the present disclosure, the effect of water generated during the activation of the catalyst on the downstream end of the catalyst bed is minimised compared to conventional catalyst reduction.

The invention claimed is:

1. A process for producing a reduced-and-passivated cobalt-containing Fischer-Tropsch catalyst, the process comprising the following steps:
   (a) contacting a cobalt-containing Fischer-Tropsch catalyst with a reducing gas under conditions suitable to produce a reduced cobalt-containing Fischer-Tropsch catalyst;
   (b) under a non-oxidising atmosphere, adjusting the temperature of the reduced cobalt-containing Fischer-Tropsch catalyst to a temperature in the range of from 0° C. to 200° C.;
   (c) contacting the reduced cobalt-containing Fischer-Tropsch catalyst with an oxygen-containing gas stream comprising from 0.1% v/v to 5% v/v oxygen with the balance being an inert gas, at a temperature in the range of from 0° C. to 200° C., in order to produce a reduced-and-passivated cobalt-containing Fischer-Tropsch catalyst;
   wherein, in step (c), the amount of oxygen in the oxygen-containing gas stream, and the temperature, are selected and maintained to produce a reduced-and-passivated cobalt-containing Fischer-Tropsch catalyst wherein from 15 to 40 mol. % of the cobalt thereon is in the form of cobalt oxide; and
   wherein the amount of oxygen in the oxygen-containing gas stream, and the temperature, are selected by the steps of:
   (i) performing steps (a) to (c) of the method for a Fischer-Tropsch catalyst having a given composition and under a given set of process conditions at a first temperature and using an oxygen-containing gas stream having a first oxygen content to produce a test catalyst;
   (ii) determining the proportion of cobalt on the test catalyst that is in the form of cobalt oxide by performing temperature programmed reduction of the test catalyst;

(iii) if the proportion of cobalt on the test catalyst that is in the form of cobalt oxide is outside the range of from 15 to 40 mol. %, repeating steps (i) and (ii) at a second temperature, different to the first temperature, and/or a second oxygen content, different to the first oxygen content.

2. A process according to claim 1, wherein from 20 to 32 mol. % of the cobalt on the reduced-and-passivated cobalt-containing Fischer-Tropsch catalyst is in the form of cobalt oxide.

3. A process according to claim 1, wherein the contacting step (c) comprises contacting the reduced cobalt-containing Fischer-Tropsch catalyst with the oxygen-containing gas stream at a temperature of from 5° C. to 100° C.

4. A process according to claim 1, wherein the oxygen-containing gas stream comprises from 0.2% v/v to 2.5% v/v oxygen.

5. A process according to claim 1, wherein the oxygen-containing gas stream is contacted with the reduced cobalt-containing Fischer-Tropsch catalyst continuously in a fixed bed reactor.

6. A process according to claim 5, wherein the oxygen gas containing stream is contacted with the reduced cobalt-containing Fischer-Tropsch catalyst at a GHSV of from 1000 to 30000 h$^{-1}$.

7. A process according to claim 1, wherein the contacting step (c) is conducted at a pressure of from 1 bar absolute to 31 bar absolute.

8. A process according to claim 1, wherein the reduced cobalt-containing Fischer-Tropsch catalyst comprises one or more promoters.

9. The process according to claim 8, wherein the one or more promoters are selected from the list consisting of ruthenium, palladium, platinum, rhodium, rhenium, manganese, chromium, nickel, iron, molybdenum, boron, tungsten, zirconium, gallium, thorium, lanthanum, cerium and mixtures thereof.

10. A process according to claim 1, wherein the reduced-and-passivated cobalt-containing Fischer-Tropsch catalyst is stored under a dry atmosphere, and/or wherein the reduced-and-passivated cobalt-containing Fischer-Tropsch catalyst is coated with wax or hydrocarbons.

11. A process according to claim 10, wherein in part (a) the cobalt-containing Fischer-Tropsch catalyst is reduced by contacting the catalyst with a flow of hydrogen at a temperature of from 200° C. to 600° C.

12. A process according to claim 1, wherein from 20 to 35 mol. % of the cobalt on the reduced-and-passivated cobalt-containing Fischer-Tropsch catalyst is in the form of cobalt oxide.

13. A start-up process for a Fischer-Tropsch catalyst, the start-up process comprising the steps of:

(a) contacting a cobalt-containing Fischer-Tropsch catalyst with a reducing gas under conditions suitable to produce a reduced cobalt-containing Fischer-Tropsch catalyst;

(b) under a non-oxidising atmosphere, adjusting the temperature of the reduced cobalt-containing Fischer-Tropsch catalyst to a temperature in the range of from 0° C. to 200° C.;

(c) contacting the reduced cobalt-containing Fischer-Tropsch catalyst with an oxygen-containing gas stream comprising from 0.1% v/v to 5% v/v oxygen with the balance being an inert gas, at a temperature in the range of from 0° C. to 200° C., in order to produce a reduced-and-passivated cobalt-containing Fischer-Tropsch catalyst;

wherein, in step (c), the amount of oxygen in the oxygen-containing gas stream, and the temperature, are selected and maintained to produce a reduced-and-passivated cobalt-containing Fischer-Tropsch catalyst wherein from 15 to 40 mol. % of the cobalt thereon is in the form of cobalt oxide; and wherein the amount of oxygen in the oxygen-containing gas stream, and the temperature, are selected by the steps of:

(i) performing steps (a) to (c) of the start-up process for a Fischer-Tropsch catalyst having a given composition and under a given set of process conditions at a first temperature and using an oxygen-containing gas stream having a first oxygen content to produce a test catalyst;

(ii) determining the proportion of cobalt on the test catalyst that is in the form of cobalt oxide by performing temperature programmed reduction of the test catalyst;

(iii) if the proportion of cobalt on the test catalyst that is in the form of cobalt oxide is outside the range of from 15 to 40 mol. %, repeating steps (i) and (ii) at a second temperature, different to the first temperature, and/or a second oxygen content, different to the first oxygen content (d) contacting the reduced cobalt-containing Fischer-Tropsch catalyst with a syngas gas stream under conditions suitable to activate the catalyst for Fischer-Tropsch synthesis;

(e) optionally adjusting the temperature to the desired reaction temperature for performing Fischer-Tropsch synthesis with the activated catalyst from step (d).

14. The process of claim 13, wherein step (d) is performed at a temperature of less than 350° C.

15. The process of claim 13, wherein the syngas stream in step (d) comprises hydrogen and carbon monoxide in a H$_2$:CO ratio of from about 1:1 to about 3:1.

16. The process of claim 13, wherein less than 10 mol. % of the cobalt on the activated catalyst from step (d) is in the form of cobalt oxide.

17. The process of claim 13, wherein in step (d) the syngas stream is contacted with the catalyst at a GHSV of from 500 to 10000 h$^{-1}$.

18. The process of claim 13, wherein in step (d) the syngas stream is contacted with the catalyst at a pressure of from atmospheric pressure to 51 bar absolute.

19. The process of claim 13, wherein in the optionally adjusting the temperature to the desired reaction temperature for performing Fischer-Tropsch synthesis with the activated catalyst from step (d), the temperature is adjusted to a temperature of from 100° C. to 400° C.; or alternatively wherein in step (e) the temperature is maintained at a temperature used in step (d).

20. The process of claim 13, wherein from 20 to 32 mol. % of the cobalt on the reduced-and-passivated cobalt-containing Fischer-Tropsch catalyst is in the form of cobalt oxide.

21. The process of claim 13, wherein the reduced-and-passivated cobalt-containing Fischer-Tropsch catalyst in step (a) is a supported catalyst.

22. The process of claim 13, wherein the start-up process comprises the steps of:

(a) contacting a cobalt-containing Fischer-Tropsch catalyst with a reducing gas under conditions suitable to produce a reduced cobalt-containing Fischer-Tropsch catalyst;

(b) under a non-oxidising atmosphere, adjusting the temperature of the reduced cobalt-containing Fischer-Tropsch catalyst to a temperature in the range of from 0° C. to 100° C.;

(c) contacting the reduced cobalt-containing Fischer-Tropsch catalyst with an oxygen-containing gas stream comprising from 0.1% v/v to 5% v/v oxygen with the balance being an inert gas, at a temperature in the range of from 0° C. to 100° C., in order to produce a reduced-and-passivated cobalt-containing Fischer-Tropsch catalyst;

wherein, in step (c), the amount of oxygen in the oxygen-containing gas stream, the temperature, and the time are selected and maintained to produce a reduced-and-passivated cobalt-containing Fischer-Tropsch catalyst wherein from 20 to 35 mol. % of the cobalt thereon is in the form of cobalt oxide; and wherein, in step (c), the temperature of the catalyst is prevented from exceeding 100° C.

23. The process of claim 13, wherein the reduced-and-passivated cobalt-containing Fischer-Tropsch catalyst provided in step (a) is produced in a different location to where the start-up process is performed.

24. The process according to claim 23, wherein the reduced-and-passivated cobalt-containing Fischer-Tropsch catalyst is stored under a dry or inert atmosphere during transportation.

* * * * *